Patented June 14, 1932

1,863,241

UNITED STATES PATENT OFFICE

FITZGERALD DUNNING AND ARTHUR E. STICKELS, OF BALTIMORE, MARYLAND, ASSIGNORS TO HYNSON, WESTCOTT & DUNNING, INC., OF BALTIMORE, MARYLAND, A CORPORATION OF MARYLAND

MERCURY DERIVATIVES OF HALOGENATED SULPHONE PHTHALEINS

No Drawing. Application filed April 4, 1928. Serial No. 267,482.

Our invention relates to mercury derivatives of halogenated sulphone phthaleins which are useful as pharmaceuticals and to processes for preparing the same.

We have found that mono- and di-mercury derivatives can be prepared from various halogenated sulphone phthaleins by treating an aqueous solution of a soluble salt, preferably the di-sodium salt, of the halogenated sulphone phthalein, with a suitable amount of a soluble mercuric salt, preferably the acetate or the chloride, in aqueous solution. A precipitate is formed and the mixture is boiled until a test with ammonium sulphide shows no ionic mercury. The amount of mercuric salt used is equivalent to the calculated molecular proportion necessary for the formation of the mono- or di-mercury derivative as the case may be.

The term "halogenated sulphone phthalein" as used in the description and claims is to be understood as including any halogenated sulphone phthalein, for instance, halogenated phenol sulphone phthalein, the halogenated cresol sulphone phthaleins, halogenated resorcinol sulphone phthalein and the like.

The sulphone phthaleins contain two phenolic nuclei and a sulpho-benzoic acid nucleus so that it is possible to have three types of halogenated sulphone phthaleins, namely, those which contain the halogen in (1) the phenolic nuclei, (2) the sulpho-benzoic acid nucleus, and (3) both the sulpho-benzoic acid nucleus and the phenolic nuclei. We have found that all three types of halogenated sulphone phthaleins may be mercurated in the manner described above. The position of the halogens is indicated by the name of the compound. For example, in di-brom phenol tetra-iodo sulphone phthalein the bromine is present in the phenolic nuclei and the iodine is present in the sulpho-benzoic acid nucleus.

Halogenated sulphone phthaleins containing halogen substituents in the phenolic nuclei may be prepared by direct halogenation of sulphone phthaleins by known processes.

Halogen derivatives of sulphone phthaleins containing halogen substituents in the sulpho-benzoic acid nucleus may be prepared by condensing halogenated ortho-sulphobenzoic acids or the corresponding anhydrides with phenols at a temperature of about 120–170° C. with or without a condensing agent. These halogen derivatives on direct halogenation yield halogen derivatives containing halogen substituents in both the sulpho-benzoic acid nucleus and the phenolic nuclei. These halogen derivatives may be prepared by the processes disclosed in a patent in the name of Wilton E. Harden, No. 1,786,611, patented Dec. 30, 1930. Ortho-sulpho-benzoic acids and anhydrides may be halogenated by treatment with halogen in fuming sulphuric acid at temperatures between 60–170° C. as described in a patent in the name of Daniel Twiss, No. 1,760,328, patented May 27, 1930.

We have found it to be possible to mercurate all halogen derivatives whether chlorine, bromine or iodine derivatives. Furthermore, mixed halogen derivatives of all three types described above containing different halogens can be mercurated by our process.

We have prepared, for example, mono- and di-mercury derivatives of:

I.—Dihalogenated phenol, resorcinol and o-cresol sulphone phthaleins.

II.—Phenol, resorcinol and o-cresol dihalogenated sulphone phthaleins.

III.—Dihalogenated phenol, resorcinol and o-cresol dihalogenated sulphone phthaleins.

IV.—Tetrahalogenated phenol, resorcinol and o-cresol tetrahalogenated sulphone phthaleins.

V.—Tetrahalogenated phenol, resorcinol and o-cresol sulphone phthaleins.

VI.—Phenol, resorcinol and o-cresol tetrahalogenated sulphone phthaleins.

VII.—Dihalogenated phenol, resorcinol and o-cresol tetrahalogenated sulphone phthaleins.

VIII.—Tetrahalogenated phenol, resorcinol and o-cresol dihalogenated sulphone phthaleins.

The constitution of the new compounds which we have prepared may be exemplified by the following probable structural formulae:

A mercury derivative of a halogenated phenol sulphone phthalein:

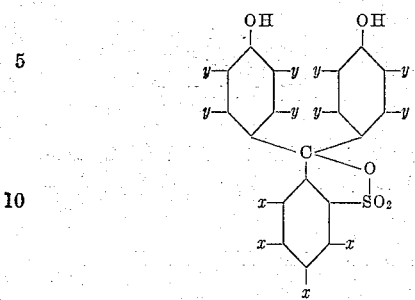

in which $x$ stands for hydrogen or a halogen and $y$ stands for hydrogen, —HgOH, or a halogen where one or two $y$'s are —HgOH and at least one $x$ or at least two $y$'s being halogen.

A mercury derivative of a halogenated resorcinol sulphone phthalein:

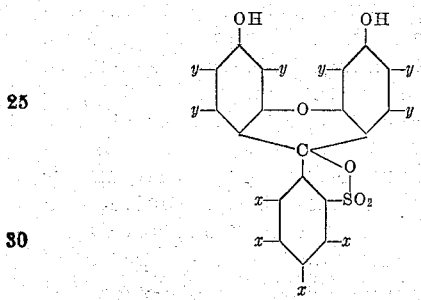

in which $x$ stands for hydrogen or a halogen and $y$ stands for hydrogen, —HgOH, or a halogen where one or two $y$'s are —HgOH and at least one $x$ or at least two $y$'s being halogen.

By the term "mercury" as used in the description, formulae and claims, we understand the combining form of mercury, presumably the —HgOH group, but we do not wish to limit our invention thereto. The mercury substituent enters the phenolic nuclei. In the di-mercury derivatives one mercury substituent is probably present in each phenolic nucleus. However, the exact position of the mercury substituent in the phenolic nucleus is not known.

*Example 1.*—Preparation of the mono-hydroxy mercury derivative of di-iodo resorcinol sulphone phthalein.

61.9 g. ($\frac{1}{10}$ mol.) of di-iodo resorcinol sulphone phthalein were dissolved in 200 cc. of normal NaOH and 500 cc. of water. To this solution 31.5 g. ($\frac{1}{10}$ mol.) of mercuric acetate dissolved in 125 cc. of water were added. The mixture was boiled for about an hour or longer until a test with ammonium sulphide showed no ionic mercury, filtered, and precipitated with hydrochloric acid. The precipitate was filtered off and dried at 110° C.

The di-sodium salt was made by dissolving in the calculated amount of sodium hydroxide and evaporating to dryness.

Other dihalogenated derivatives of resorcinol sulphone phthalein and its analogs can be mercurated in the same manner.

By using twice the amount of mercuric acetate the di-hydroxy-mercury derivatives can be made by the same procedure.

*Example 2.*—Preparation of the mono-hydroxy-mercury derivative of phenol tetra-brom sulphone phthalein.

Twelve and four tenths grams of phenol tetra-brom sulphone phthalein were dissolved in 40 cc. of normal sodium hydroxide solution diluted to about 200 cc. and filtered. To this solution was added a filtered solution of 6.5 gms. of mercuric acetate in water, plus several drops of acetic acid. The combined solutions were boiled under a reflux condenser until a test tube portion showed no test for free mercury with ammonium sulphide solution and were then poured into 1:1 hydrochloric acid solution with vigorous mechanical stirring. The precipitate was filtered by suction and dried at 110° C.

The di-sodium salt was prepared by dissolving in the calculated amount of normal sodium hydroxide and evaporating to dryness.

By using twice the amount of mercuric acetate the di-hydroxy, mercury derivative can be prepared.

The mono- and di-hydroxy-mercury derivatives of phenol, cresol and resorcinol di-brom sulphone phthaleins can be prepared in an analogous manner.

*Example 3.*—The mono-hydroxy-mercury derivative of di-brom phenol tetra-brom sulphone phthalein and its di-sodium salt was prepared by a procedure analogous to that described in Example 2.

By using twice the amount of mercuric acetate the di-hydroxy-mercury derivative can be obtained.

Di-iodo phenol tetra-iodo sulphone phthalein and di-iodo resorcinol tetra-iodo sulphone phthalein may be used in place of di-brom phenol tetra-brom sulphone phthalein and the corresponding mercury derivatives obtained.

*Example 4.*—87.7 gms. of tetra-iodo resorcinol sulphone phthalein were dissolved in 200 cc. of normal alkali, and 32 gms. of mercuric acetate dissolved in 150 cc. of water, containing a small amount of acetic acid, were added and the mixture was warmed until a test portion dissolved clear in ammonium sulphide. The mercurated product was then precipitated by adding hydrochloric acid. The precipitate was filtered off, washed with water and dried.

The sodium salt was made by dissolving 8.7 grams in 20 cc. of normal alkali and evaporating the solution to dryness.

By using an excess of mercuric acetate the di-mercury derivative can be obtained by the above procedure.

*Example 5.*—112.3 grams of tetra-iodo resorcinol di-iodo sulphone phthalein were dissolved in 200 cc. of normal alkali and 32 grams of mercuric acetate dissolved in 150 cc. of water, containing a small amount of acetic acid, were added and the mixture was warmed until a test portion dissolved clear in ammonium sulphide. The mercurated product was then precipitated by adding hydrochloric acid. The precipitate was filtered off, washed with water and dried.

The sodium salt was made by dissolving 11.2 gms. in 20 cc. of normal alkali and evaporating the solution to dryness.

By using an excess of mercuric acetate the di-mercury derivative can be obtained by the above procedure.

The mono- and di-mercury derivatives of tetra-iodo resorcinal tetra-iodo sulphone phthalein and their di-sodium salts were prepared by an analogous procedure.

In the appended claims the expression "mercury derivative" embraces all possible mono- and di-mercury derivatives of the respective halogenated sulphone phthaleins, and the free acids thereof, as well as the alkali metal salts thereof.

We claim:

1. A mercury-containing compound of a halogenated sulphone phthalein having most probably the formula

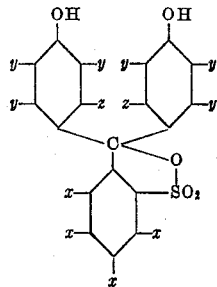

in which $x$ stands for hydrogen or halogen, $y$ stands for hydrogen, halogen or —HgOH and $z$ stands for hydrogen or halogen, at least one and not more than two $y$'s being —HgOH and at least one $x$ being halogen.

2. A mercury-containing compound of a halogenated sulphone phthalein having most probably the formula

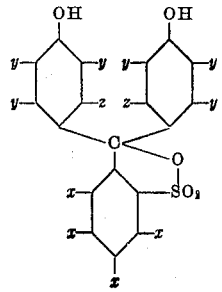

in which $x$ stands for hydrogen or halogen, $y$ stands for hydrogen, halogen or —HgOH and $z$ stands for hydrogen or halogen, at least one and not more than two $y$'s being —HgOH and four $y$'s being halogen.

3. A mercury-containing compound of a halogenated sulphone phthalein having most probably the formula

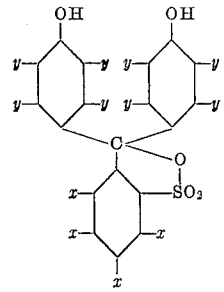

in which $x$ stands for hydrogen or halogen and $y$ stands for hydrogen, halogen, or HgOH, at least one but not more than four $y$'s being halogen, at least one $x$ being halogen, and at least one $y$ and not more than two $y$'s being —HgOH.

In testimony whereof, we affix our signatures.

FITZGERALD DUNNING.
ARTHUR E. STICKELS.